United States Patent [19]

Holmgren

[11] Patent Number: 4,819,797
[45] Date of Patent: Apr. 11, 1989

[54] SEAL FOR A BOX ENCLOSING A COMPACT DISC OR TAPE CASSETTE

[75] Inventor: Kjell Åke B. Holmgren, Trelleborg, Sweden

[73] Assignee: MW Trading APS, Glyngore, Denmark

[21] Appl. No.: 929,746

[22] Filed: Nov. 12, 1986

[30] Foreign Application Priority Data

Nov. 13, 1985 [SE] Sweden .................. 8505353
Nov. 5, 1986 [EP] European Pat. Off. ......... 86850387.1

[51] Int. Cl.⁴ ................. B65D 85/57; B65D 85/672
[52] U.S. Cl. .............................. 206/309; 206/307; 206/387
[58] Field of Search ............... 70/63; 206/1.5, 309, 206/387, 444, 807; 211/40; 220/215, 223; 312/10, 12

[56] References Cited

U.S. PATENT DOCUMENTS

| | | | |
|---|---|---|---|
| 3,495,716 | 2/1970 | Gregory | 206/387 |
| 3,828,922 | 8/1974 | Holkestad | 206/387 |
| 3,933,240 | 1/1976 | Humble | |
| 4,096,718 | 6/1978 | Michelman et al. | 70/63 |
| 4,285,429 | 8/1981 | MacTavish | 211/40 |
| 4,466,540 | 8/1984 | Lotrous et al. | 206/1.5 |
| 4,589,549 | 5/1986 | Hehn | 206/1.5 |

FOREIGN PATENT DOCUMENTS 2735151 2/1979 Fed. Rep. of Germany .
8422027 10/1984 Fed. Rep. of Germany .
0531868 2/1973 Switzerland .

*Primary Examiner*—Jimmy G. Foster
*Attorney, Agent, or Firm*—Merchant, Gould, Smith, Edell, Welter & Schmidt

[57] ABSTRACT

The invention provides a seal for a box (10, 11) enclosing a compact disc, which comprises two rectangular box halves hingedly interconnected. The seal comprises a blocking element (14, 15, 16) to be applied to the box on the outside thereof, and this blocking element engages the two box halves with the box in closed position and is engaged therewith by means of a latch mechanism (18, 19) positively locking into the box halves. The latch mechanism can be operated to an unlocked position by means of a special tool for disengaging the blocking element from the box.

5 Claims, 10 Drawing Sheets

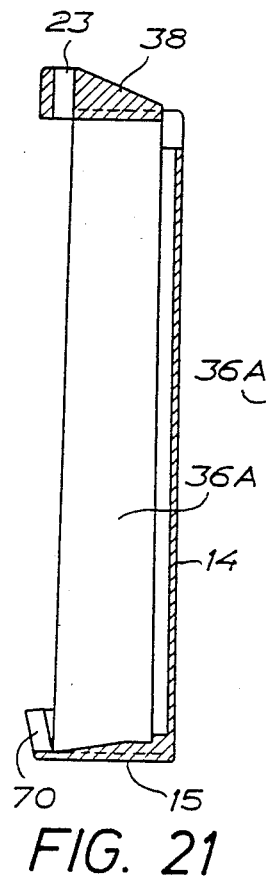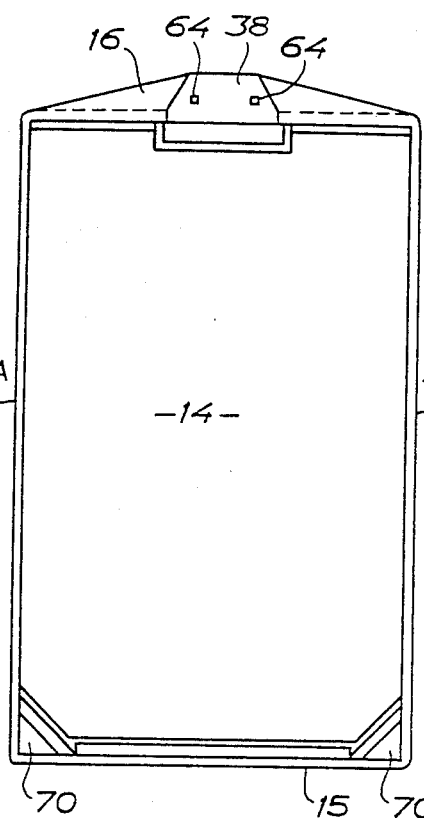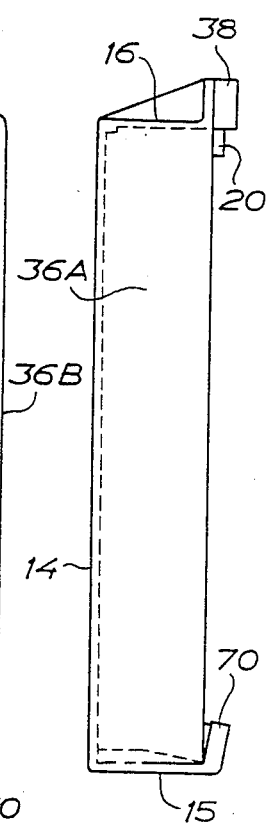
FIG. 21   FIG. 19   FIG. 20
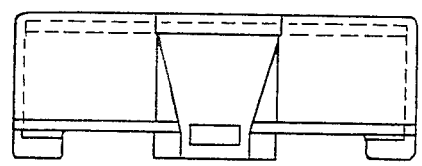
FIG. 22

SEAL FOR A BOX ENCLOSING A COMPACT DISC OR TAPE CASSETTE

The invention relates to a seal for a box enclosing a compact disc or tape cassette, including e.g. MC, Video, and DAT cassettes. The box usually comprises two rectangular box halves which are hingedly connected to each other.

In shops where gramophone discs are sold, these are freely available to the customers such that they can easily and comfortably make their choice of the discs that they want to buy. Then, it is, of course, very likely that an unscrupulous person from time to time gives away to the temptation to appropriate a disc without paying for it. It is difficult to smuggle unobserved common discs from the shop due to the size of such discs, but by the compact disc having been put on the market, the problem of thefts in gramophone disc shops has been accentuated. The compact disc is no more than 12 cm in diameter ad therefore it can easily be hidden. Since the compact disc, moreover, is more expensive than a conventional gramophone disc, the theft of a compact disc will be the more considerable for the shop owner.

As a preventing measure it is possible to provide the box with a marking which activates a protecting system if somebody tries to remove the box from the shop with a disc enclosed therein without the marking having first been deactivated, but as is easily understood, in that case it is attempted to pass the protecting system by taking out the disc from the box and take it along while the emptied box is left on the shelf. Therefore, it is obviously necessary to combine such marking with some form of seal which makes it difficult to open the box or to remove the disc therefrom in another way.

The problems encountered as far as compact discs are concerned, are true also for boxes enclosing cassette tapes and video tapes.

It is accordingly a matter of effectively sealing the box enclosing the disc in such a way that the box cannot easily be opened and in any case cannot be opened without considerable difficulties being involved. At the same time it is necessary that the seal can be applied without the necessity of substantially modifying the box and that the seal can be produced at reasonable costs. Moreover, it is desired that the seal can be applied to the box without the necessity of tearing a transparent wrapper of plastic film or cellophane enclosing the box.

In order to satisfy the requirements mentioned above the invention provides a seal of the type referred to which has obtained the characterizing features defined in claim 1.

In a seal of this type, the blocking element can easily be provided with a marking activating a protecting system, in such a manner that the marking cannot be removed e.g. by moulding or otherwise including the marking into the material of which the blocking element is made, or by applying the marking to a side surface of the blocking element, facing the box, so that it is not available when the blocking element is applied to the cassette.

Moreover, the blocking element is well suited for multiple use, because it can be removed from the box by means of the special tool when payment is being effected, without the blocking element being broken or destroyed in other respects.

The invention also provides a safety system for boxes enclosing compact discs or tape cassettes of the type referred to comprising a blocking element to be applied to the box and preventing the box from being opened, and a special tool for unlocking a latch mechanism retaining the blocking element on the box.

BRIEF DESCRIPTION OF THE DRAWINGS

In order to explain the invention in more detail an embodiment thereof will be described below, reference being made to the accompanying drawings in which FIG. 19 is a plan view blocking element for a box enclosing a cassette tape, FIG. 20 is a side view of the blocking element in FIG. 19, FIG. 21 is a vertical cross-sectional view of the blocking element in FIGS. 19 and 20, FIG. 22 is an end view of the blocking element in FIGS. 19 to 21.

DETAILED DESCRIPTION OF THE INVENTION

Figure 1:
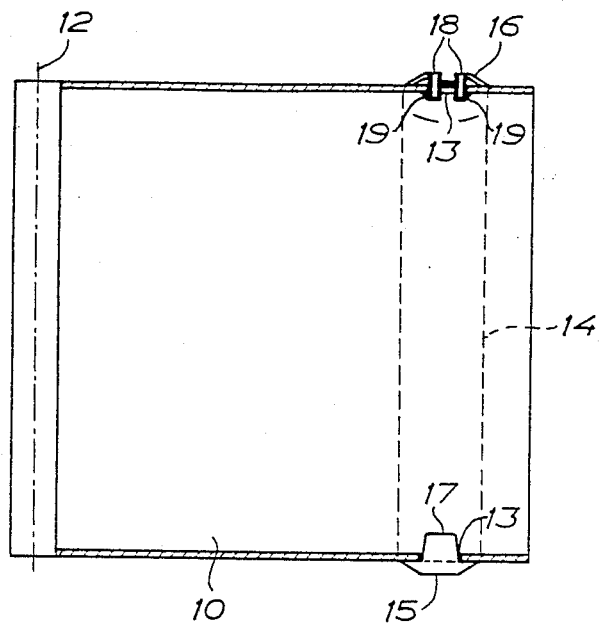
FIG. 1 is a horizontal cross-sectional view of a box provided with the seal of the invention comprising a blocking bow partly shown in cross section.
Figure 2:
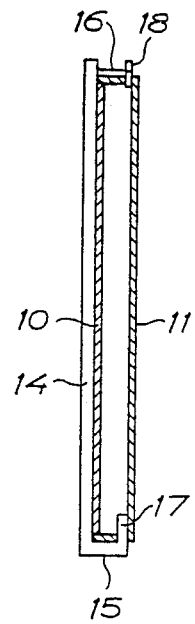
FIG. 2 is a vertical cross-sectional view of the box in FIG. 1.
Figure 3:
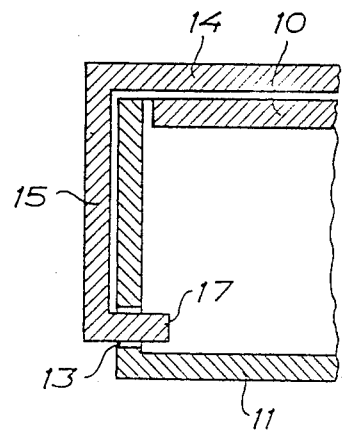
FIG. 3 is an enlarged fragmentary vertical cross-sectional view of the blocking bow and the box.

The box shown in FIGS. 1 to 3 in the drawings is of the type commonly known for enclosing compact discs. The box comprises two halves 10 and 11 which are hingedly interconnected for pivotal movement about an axis 12. One box half 10 is tailored to receive therein the compact disc while the other box half 11 forms a cover on the box half 10. The box in its entirety is made of a plastic material and at least the box half 11 is transparent such that a decoration and/or an information text on the disc in the box can be exposed by locating a printed insert of paper or plastic material inside the box. For the retention of this insert the box half 11 can have two pairs of opposite flaps being combined with an edge aperture 13 for manufacturing reasons.

The seal of the invention comprises a U-shaped blocking bow of some transparent or semi-transparent rather durable plastic material having some elasticity and springiness in order that the bow can be deformed to some extent without cracking. A suitable plastic material is chosen from the group comprising polycarbonate, polyethyelene, and polypropylene. However, also steel or other metal can be used for the bow. The bow comprises a flat web 14 and two limbs 15 and 16 extending perpendicularly to the web. One limb 15 has a flap 17 projecting perpendicularly inwardly therefrom, and the other limb 16 forms two sockets 18 having hooks 19 facing away from each other.

The bow is applied to the closed box by the web 14 of the bow being positioned against the outside surface of the box half 10 while the flap 17 on one limb of the bow is inserted into one of the two opposite edge apertures 13 or an edge aperture in the box half 11 provided specifically for this purpose. The sockets 18 provided on the other limb are inserted in the opposite edge aperture 13 or an edge aperture provided specifically for this purpose, in order that the hooks 19 of the sockets shall engage by snap action the edges of this aperture, the bow material allowing the sockets to be resiliently moved towards each other.

Applied in this manner, the blocking bow keeps the two box halves together and prevents opening of the box without further. This cannot be done without breaking the frame if a special tool is not available for removing the blocking bow.

However, when payment is effected, the blocking bow can be removed by the cashier by using such special tool by means of which the sockets 18 are pressed towards each other in order to disengage the hooks 19 from the edges of the aperture 13. A tool of this type can comprise pins which are inserted into the sockets and are actuated to angle the pins so as to move the ends thereof forming the hooks towards each other.

As mentioned above, the blocking bow can be provided with a marking for activating a protecting system. Such marking either can be embedded into the frame material or can be applied to the side surface of the bow web which in the operative position of the bow is facing the box so that the marking is not available for damage.

It is not necessary that the blocking element is made as a bow in the manner described above, because it can also comprise a closed frame which extends around the box along the edges thereof, the frame at least to some extent being of U-shaped cross-sectional form to embrace the two box halves. The frame can be opened but is kept together in the operative position thereof by means of the latch mechanism which can be actuated by means of said special tool.

An alternative to the latch mechanism including the sockets 18 with the hooks 19 is shown in FIGS. 4 to 8. This latch mechanism includes a U-shaped male element 20 of a material allowing the limbs of the member to be pressed against each other. Each limb has two projections 21 on the outer edge thereof and forms a shoulder 22 on the inner edge thereof. In the limb 16 of the blocking bow there is provided a through aperture 23 having recesses 24 for receiving therein the projections 21 when the male element is inserted into the aperture. Two side openings 25 in register with each other extend from the outside up to the aperture 23.

Figure 5:
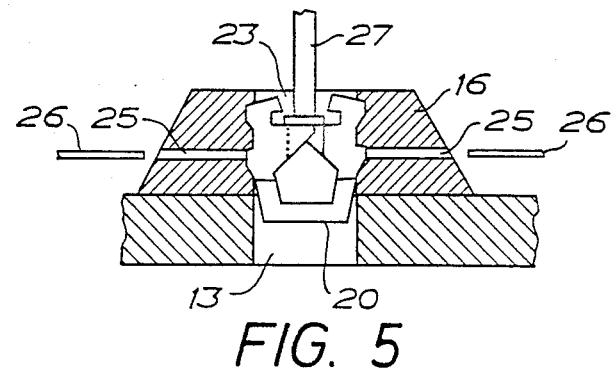
FIG. 5 is a view corresponding to FIG. 4 but with the latch mechanism in the blocking condition thereof.

The blocking bow is locked by the male latch element 20 being pushed into the aperture 23 so that the projections 21 can engage by snap action into the recesses 24, the element projecting into the edge aperture 13 in the box half 10 as is shown in FIG. 5. Then, the blocking bow is locked. It can be unlocked by inserting two pins 26 into the openings 25 and by pressing these pins against the limbs of the element 20 so that the projections 21 are disengaged from the recesses 24 while a key 27 is inserted into the latch male element in order to engage the shoulders 22 at a head 28 on the key when the limbs of the latch male element are resiliently pressed together. When the latch male element arrives at the position according to FIG. 6, the two lower projections on this element will engage by snap action the two upper recesses in the aperture 23 so that the latch male element will disengage from the key and now will be retained in an unlocked position in which it allows the blocking bow to be removed from the box. When it is desired to lock again the blocking bow on a box, the latch male element is pressed into the aperture 23 to the position shown in FIG. 5. The latch male element is not at all available for unlocking same without using a special tool which comprises the pins 26 and the key 27 for cooperation with the latch male element in the manner described above.

The edge surfaces of the limbs of the latch male element form each a projection 28. These projections are laterally displaced in relation to each other so that they can overlap when the limbs of the element are pressed together and they form guide members which stabilize the latch male element when the limbs thereof are resiliently pressed together.

The latch male element 20 can be reinforced by a steel strip 29 extending along the lower side of the web and partly along the outside edges of the limbs. It is hooked into the element at 30.

Figure 9:
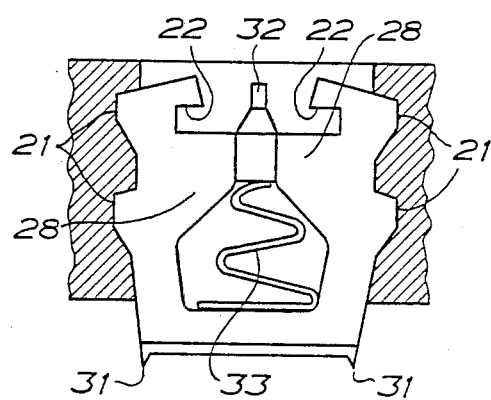
FIG. 9 is a side view of the male latch element of the latch mechanism in the engaged position in a modified embodiment thereof, the frame being fragmentarily shown in vertical cross-sectional view.
Figure 16:
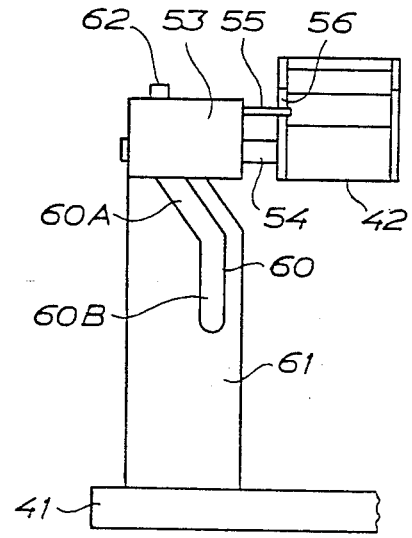
FIG. 16 is an end view of the apparatus in FIGS. 14 and 15.
Figure 10:
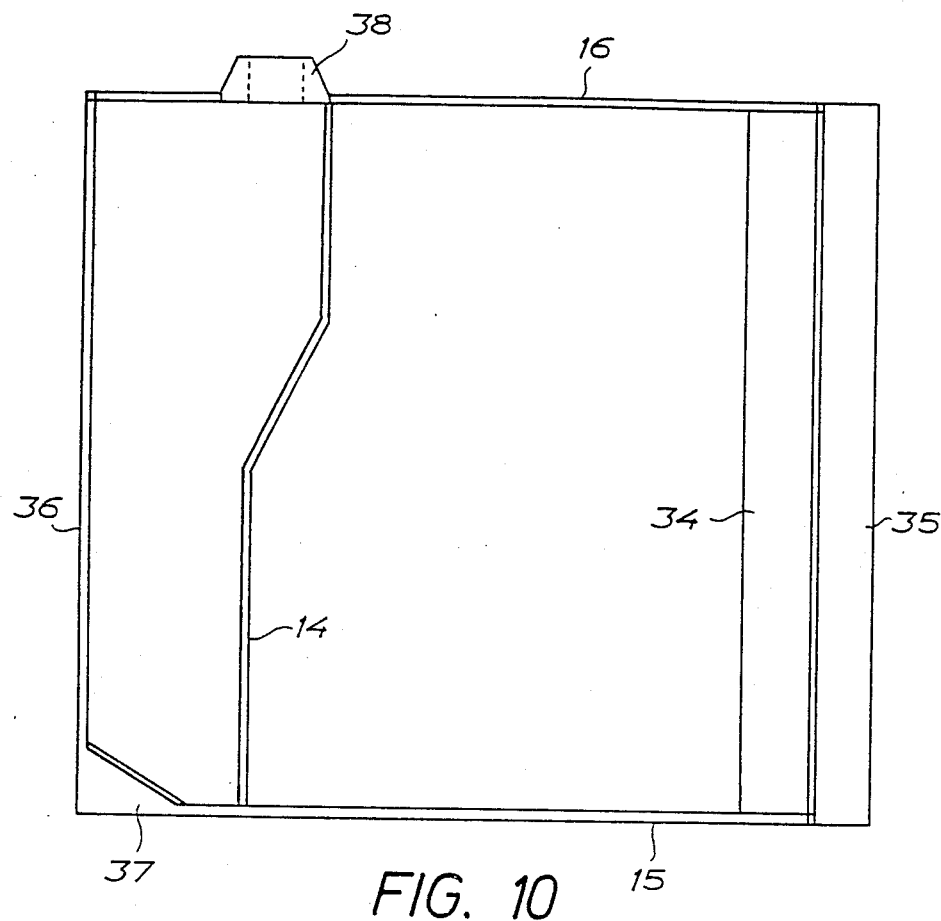
FIG. 10 is a plan view of the seal of the invention in another embodiment thereof.
Figure 11:
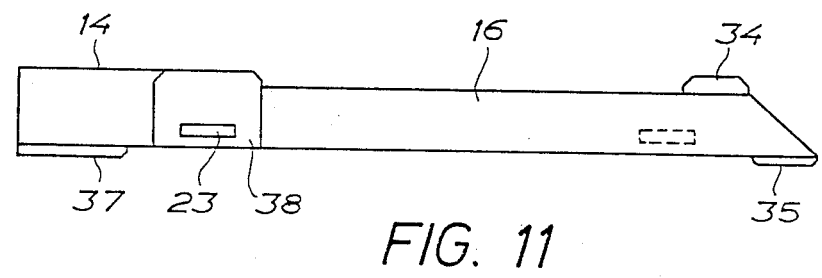
FIG. 11 is an end view of the embodiment in FIG. 10.
Figure 12:
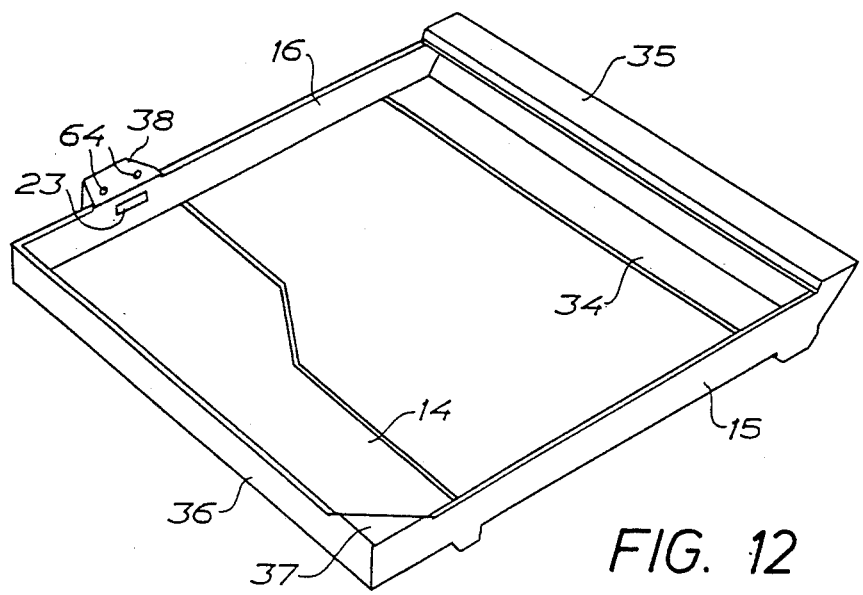
FIG. 12 is a perspective view of the embodiment in FIGS. 10 and 11.
Figure 13:
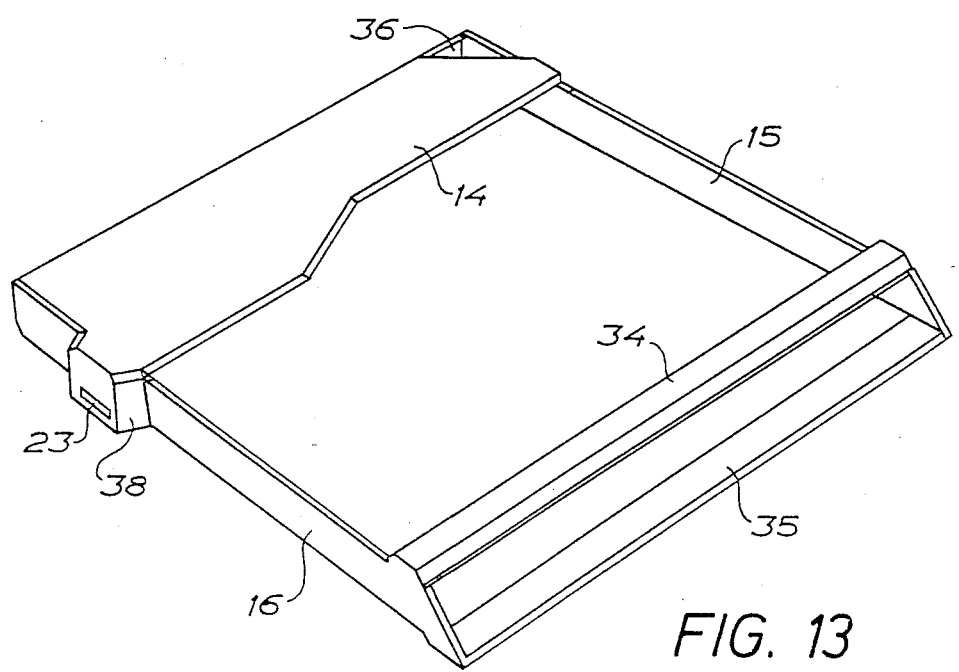
FIG. 13 is a corresponding perspective view from the other side of the embodiment in FIGS. 10 to 12.

FIG. 9 discloses some improvements that can be made on the latch male element 20. At each of the ends of the web of the element 20 a transverse sharp edge 31 is provided the purpose of which is to cut through a wrapping of plastic film or cellophane enclosing the box, when the latch male element is pushed into the aperture 23 to the operative locking position.

In the embodiment of FIG. 9 there is also provided a bolt 32 forming a spacer between inside projections 28 on the limbs of the element 20 which in this case are in register. The bolt is maintained in this position by a spring element 33. By this arrangement the two limbs are positively maintained in the position in which the projections 21 engage the recesses 24 when the latch male element is in the operative position. However, the bolt 32 can be displaced from the position between the projections 28 by the key 27 when moved into the element 20 to engage the shoulders 22.

In the embodiment of the blocking element shown in FIGS. 10 to 13, said element forms a frame the end walls 15 and 16 of which extend along two opposite edge surfaces of the box 10 when the blocking frame is applied to the box. Two webs 34 and 35 extend between the end walls 15 and 16 at one end portion thereof to be located on opposite flat sides of the box. The web 14 is integral with a side wall 36 which extends between the end walls 15 and 16 and joins these end walls at the other end thereof so as to cover one of the edge surfaces of the other pair of opposite edge surfaces of the box when the blocking frame is applied to the box. A stiffening triangular corner web 37 is provided between the side wall 36 and the end wall 15 in parallel with the web 14. As will be seen, the web 14 forms a widened portion where a coil forming part of a protecting system may be mounted. This web may be shaped in many other ways. The end wall 16 forms a thickened portion 38 in which the aperture 23 for the latch male element 20 is provided.

Figure 4:
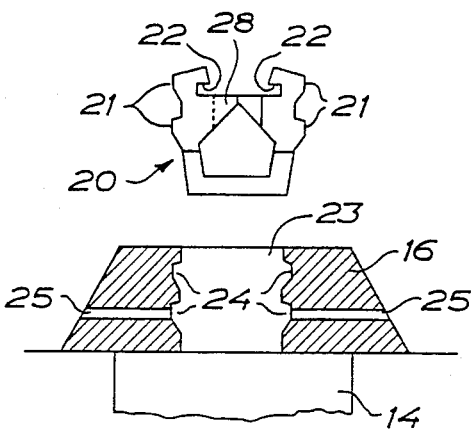
FIG. 4 is an enlarged fragmentary vertical cross-sectional view of a blocking frame, illustrating a modified latch mechanism, a male latch element of said mechanism being shown in side view separated from the frame.
Figure 6:
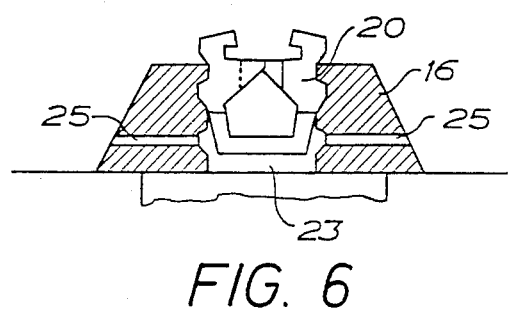
FIG. 6 is a view corresponding to FIG. 4 but with the latch mechanism in an unlocked condition thereof.
Figure 7:
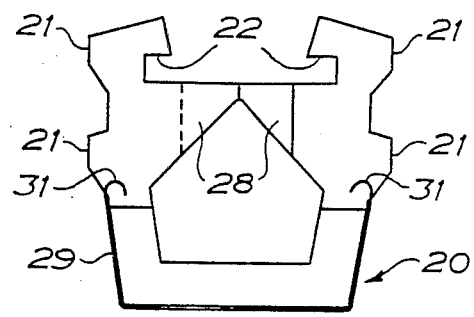
FIG. 7 is an enlarged side view of the male element of the latch mechanism.
Figure 8:
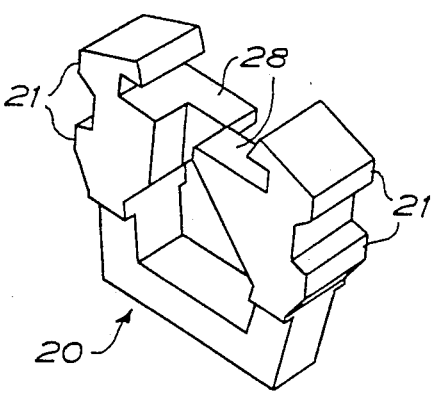
FIG. 8 is a perspective view of the element in FIG. 7.
Figure 14:
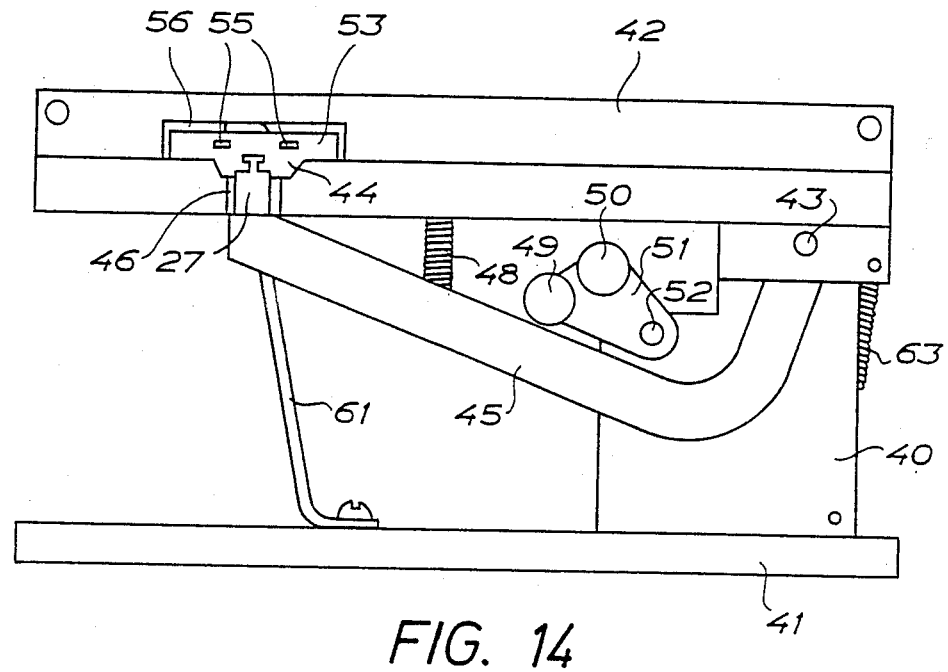
FIG. 14 is a side view of an apparatus for unlocking the latch mechanism in a rest position.
Figure 15:
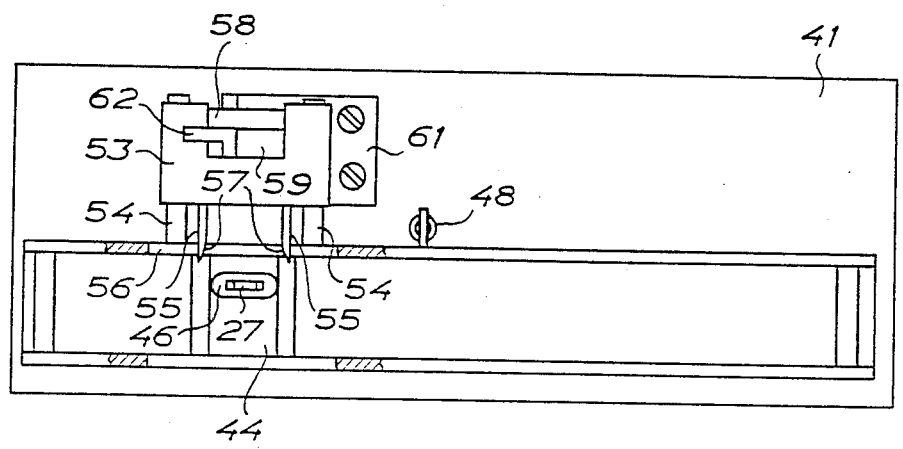
FIG. 15 is a plan view of the apparatus in FIG. 14.

The apparatus shown in FIGS. 14 to 18 is constructed for unlocking a latch mechanism of the type described with reference to FIGS. 4 to 6 by applying the functional principles disclosed in said figures. A vertical bracket 40 is mounted to a base plate 41 and a channelled rail 42 is pivotally mounted at one end to the bracket at the upper end thereof by means of a pin 43. The rail is dimensioned to receive therein a box for a compact disc with a blocking frame as shown in FIGS. 10 to 13 applied to the box and forms a bottom recess 44 to receive therein the portion 38 of the blocking frame when the end wall 16 is engaged with the bottom of the channelled rail 42. A lever 45 also pivotally mounted on the pin 43 for movement about the same axis as the rail 42 but independently thereof is provided at the free end thereof with the key 27, and an opening 46 is formed in the bottom of the rail 42 to receive the key when the lever 45 is engaged with the lower side of the bottom of the rail at the free end of the lever under the bias of a helical spring 48 engaged between the rail and the lever. Two rollers 49 and 50 are rotatably mounted in a support element 51 which is pivotally mounted to the bracket 40 by means of a pin 52 extending in parallel to the pin 43. The roller 49 is engagable with the top surface of the lever 45 and rests normally on said surface under the weigh of the support element 51 and the rollers mounted thereon as shown in FIG. 14, and the roller 50 is engagable with the lower surface of the bottom of the rail 42.

A block 53 is displaceably guided on two pins 54 projecting perpendicularly from one side of the rail 42 for displacement along said pins and mounts two pegs 55 projecting in parallel in spaced relationship from the side surface of the block 53 facing the rail. These pegs are received in an opening 56 in the adjacent side wall of the rail and are bevelled at 57 on the edge surfaces facing each other at the free ends of the pegs. A guide roller 58 is rotatably mounted to the block 53 in a cut-out 59 formed by the block and is received in a slot 60 formed by a guide element 61 mounted to the base plate 41 and projecting upwards therefrom. This guide element forms an abutment 62 and the rail 42 is biased by means of a helical spring 63 in the clockwise direction about the pin 43 so as to keep normally the rail in the position shown in FIG. 14, the block engaging the abutment 62 in this position of the rail.

The slot 60 in the guide element 61 forms an inclined portion 60A and a vertical portion 60B in order to impart to the block by the intermediary of the roller 58 a movement along the pins 54 when the rail is swung in the counter-clockwise direction against the spring bias 63. Thus, the block is moved initially during such swinging movement of the rail from the position shown in FIG. 15 to the position shown in FIG. 18 when the roller 58 passes through the slot portion 60A and will be maintained in the position of FIG. 18 when the roller 58 continues through the slot portion 60B.

Figure 17:
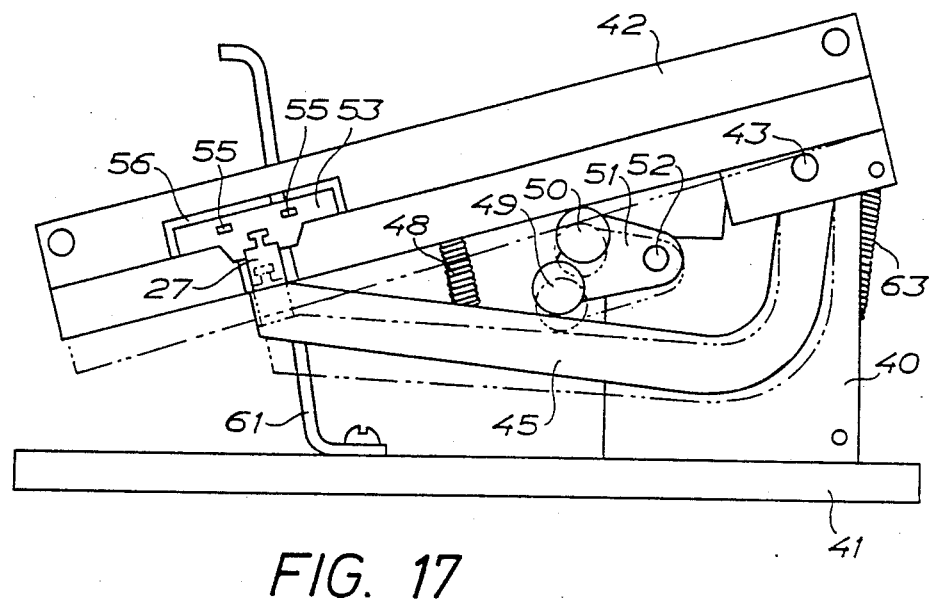
FIG. 17 is a side view similar to FIG. 14 of the apparatus during operation.
Figure 18:
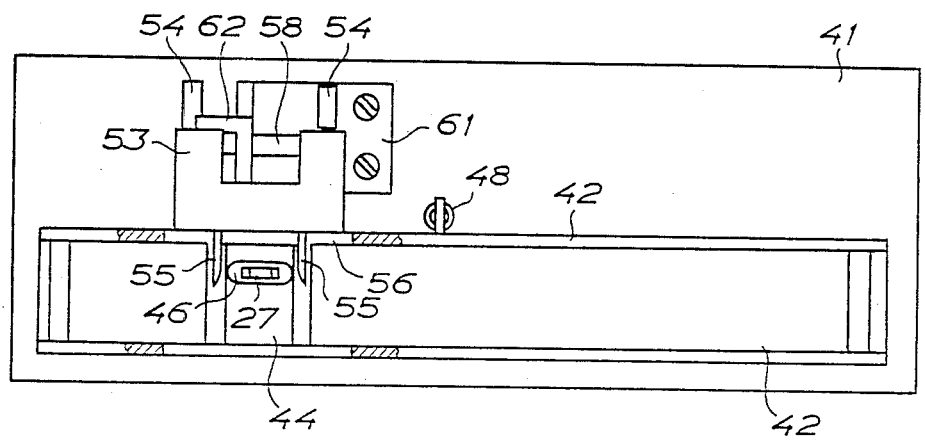
FIG. 18 is a plan view similar to FIG. 15 of the apparatus during operation.

As was explained in connection with FIG. 5, it is necessary in this stage of the unlocking process to apply a pressure against the limbs of the latch male element 20 so that the limbs are resiliently pressed together. Instead of using two pins 26 as shown in FIG. 5, the pegs 55 are provided in the apparatus described so as to move into the portion 38 through apertures 64 (FIG. 12) in order to engage the bevelled ends 57 with the limbs of the latch male element at the edge surfaces thereof facing away from each other. Thus, when the pegs 55 are moved into the apertures 64, the limbs of the latch male element will be cammed towards each other providing the same results as that obtained by means of the pins 26 in FIG. 5. Referring to FIG. 17, the rail 42 is shown therein by solid lines in an initial pivoted position in which the block 53 has been displaced by the intermediary of the guide mechanism 58, 60 from the position in FIG. 15 to the position in FIG. 18 so as to engage the limbs of the latch male element with the cross head of the key 27 at the shoulders 22 as previously described with reference to FIG. 5, the key projecting into the latch male element when received by the opening 46 as shown in FIG. 17. The pivotal movement of the rail 42 from the position in FIG. 14 to the position in FIG. 17 is obtained by depressing the rail against the bias of the spring 63 when the box with the blocking frame applied to it is engaged with and is pressed against the bottom of the rail, the portion 38 being received by the recess 44 as mentioned above.

If the rail is further depressed, the roller 50 will be engaged with the lower surface of the bottom of the rail 42 and will impart to the lever 45 a pivotal movement about the pin 43 in the counter-clockwise direction against the bias of the spring 48 in relation to the rail 42 so that the key 27 will be partly withdrawn from the opening 46 as shown by dot and dash lines in FIG. 17. By this movement, the key 27 engaged with the latch male element 20 will pull said element to the unlocked position as described with reference to FIGS. 5 and 6. Thus, when the box with the blocking frame applied to it is removed from the rail 42, the latch male element will be in the position shown in FIG. 6 and the blocking frame can again be removed from the box. The apparatus will return to the normal position shown in FIG. 14 under the bias of the springs 48 and 63 when the pressure against the rail is relieved and the box is removed from the rail.

In case of a cassette tape, no aperture 13 (FIG. 3) is available for the engagement of the blocking frame and cannot easily be provided in the tape cassette box. Accordingly, this element has to be lockingly engaged with the box in another way than described above. How this is done will be explained with reference to FIGS. 19 to 22 which disclose a blocking frame for a cassette tape box. The frame forms end walls 15 and 16, a thickened portion 38 being formed by the end wall 16 for receiving the latch mechanism, and side walls 36A and 36B.

The frame has a web 14 joining the end walls and the side walls so that the frame in fact forms a tray wherein the web 14 is the bottom and the walls 15, 16, 36A, and 36B are the side walls.

Triangular web portions 70 are formed integrally with the wall 15 and the joining walls 36A and 36B at the corners formed between said walls and these webs are slightly angled outwards as will be seen in FIGS. 20 and 21. Thus, a cassette tape box can be positioned in the frame by inserting the lower end thereof inside the webs and then moving the box into the frame so that it is totally enclosed by the frame. The latch male element 20 is then inserted into the portion 38 in the manner previously described so as to be located on the outside surface of the box as is indicated in FIG. 20, the box thus being locked in the blocking frame.

Figure 24:
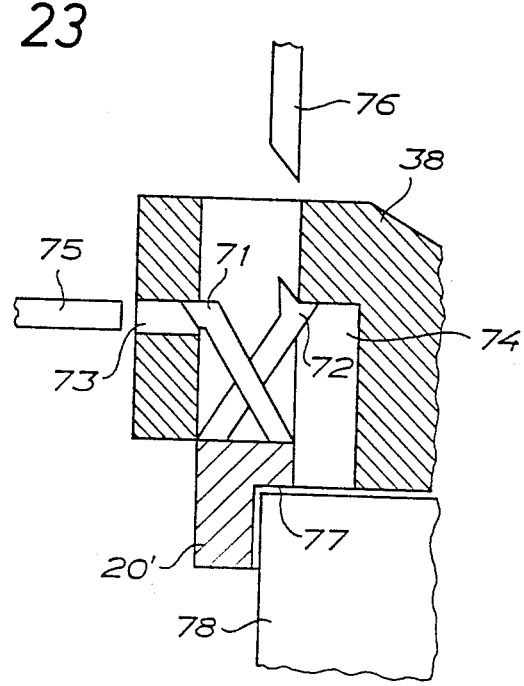
FIG. 24 is a vertical cross-sectional view of the male latch element of FIG. 23 and part of the blocking frame in the locking position thereof, the box being fragmentarily show in side view.

The latch male element 20' forms a shoulder 74 defining the locking position of the element by engaging the box fragmentarily indicated at 78 in FIG. 24.

Figure 23:
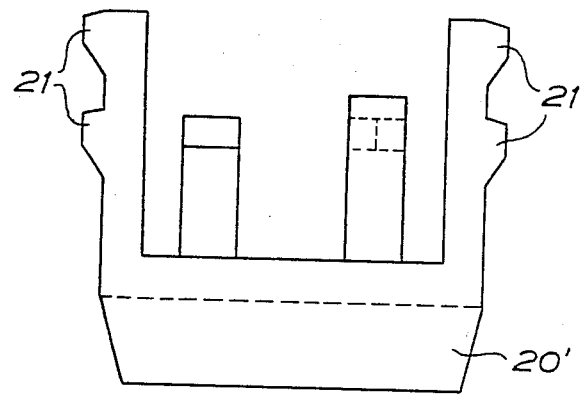
FIG. 23 is a side view of a modified male element of the latch mechanism.

Since the latch element in this case is in fact available on the outside of the box, it is proposed according to the invention to provide further engagement means (which can be used also for CD boxes) so as to increase the safety against unauthorized unlocking of the blocking frame. With reference to FIGS. 23 and 24 the latch male element 20' shown therein is shaped substantially as previously described with projections 21. However, the element also forms two hook portions 71 and 72 for engagement with an aperture 73 and a shoulder 74, respectively, formed by the portion 38 of the blocking frame, when the latch male element is in the locked position. These hook portions are not available from the outside and provide increased safety against unauthorized unlocking of the blocking frame. The hook portion 71 can be disengaged from the aperture 73 by means of a pin 75 which is moved through the aperture 73 e.g. by the movement of the block 53 described with reference to the apparatus shown in FIGS. 14 to 18, and the hook portion 72 can be disengaged by means of a wedge 76 which is pressed against said hook portion e.g. by the engagement of the box with the rail 42 in the apparatus of FIGS. 14 to 18. Since the latch member is available on the outside of the box it can be pushed to the disengaged position when the limbs have been pressed together and the hooks have been disengaged.

Accordingly, it is not necessary to use a key 27 in this case.

I claim:

1. A safety system for a box comprising two rectangular box halves which are hingedly connected to each other, and forming two flat side walls and two pairs of opposite edge walls one of said edge walls forming an aperture therein, said system comprising a blocking frame defining a space for the closed box to enclose the box at the side walls and two opposite edge walls, a latch mechanism on said frame including a latch element displaceable between a first position in which the latch element extends into the space defined by the frame to engage said aperture for locking the frame to the box, and a second position in which the latch element is withdrawn from said space, cooperating means on said latch element and said frame for latching the latch element in said first position by mutual engagement between the latch and the frame, and a tool for actuating said cooperating means to disengage the latch element from the frame for withdrawal of the latch element from said aperture to said second position.

2. The safety system as claimed in claim 1 wherein said latch element comprises a U-shaped element forming resilient limbs and said frame forms an opening to receive the latch element therein and wherein said cooperating means comprise projections on said latch element and recesses in the surfaces of the frame defining said opening for latchingly receiving the projections therein when the latch element is in said first position.

3. The safety system as in claim 2 wherein each limb of the latch element forms two projections spaced in the longitudinal direction thereof to cooperate alternatingly with said recesses formed by the frame.

4. The safety system as in claim 2 wherein the limbs of the latch elements form shoulders at the edges facing each other.

5. The safety system as in claim 2 further comprising a spacer located between the limbs of the latch element, and spring means biasing said spacer to a position in which the spacer prevents movement of the limbs towards each other, said spacer being displaceable against the spring bias to a position, in which such movement in permitted.

* * * * *